United States Patent [19]

Lamke

[11] 3,721,134
[45] March 20, 1973

[54] MOTION TRANSFER CONNECTING DEVICE
[75] Inventor: Arland D. Lamke, Franklin, Wis.
[73] Assignee: McGraw - Edison Company, South Milwaukee, Wis.
[22] Filed: Aug. 4, 1971
[21] Appl. No.: 168,852

[52] U.S. Cl. .................................. 74/586, 200/166 R
[51] Int. Cl. ............................................. G05g 23/00
[58] Field of Search....74/579 R, 587, 586; 287/20.3, 287/60, 62; 64/2; 285/255, 334.5; 123/90.61

[56] References Cited

FOREIGN PATENTS OR APPLICATIONS

| 121,283 | 4/1946 | Australia | 285/255 |
| 210,848 | 9/1957 | Australia | 285/255 |
| 86,583 | 6/1936 | Sweden | 285/255 |

Primary Examiner—Charles J. Myhre
Assistant Examiner—F. D. Shoemaker
Attorney—R. J. Falkowski

[57] ABSTRACT

A pushrod assembly is connected between a switch actuating mechanism and a switch to transfer motion from the actuating member to the switch. The pushrod assembly has an elongated hollow fiberglass cylinder with hardware at each end for attachment to the respective mechanism and switch. The hardware at each end has an internal nut with a conical outer circumference and an end socket with a conical inner diameter. The internal nut is screwed on a threaded eyebolt, and the pulling of the nut into the end socket compresses the fiberglass tube between the outer diameter of the nut and the inner diameter of the socket. A nut and washer on the eyebolt enable adjustment of the length of the pushrod assembly.

16 Claims, 3 Drawing Figures

PATENTED MAR 20 1973　　3,721,134

INVENTOR.
ARLAND LAMKE

BY
R J Falbowski
ATTORNEY

MOTION TRANSFER CONNECTING DEVICE

This invention relates to motion transfer connecting devices, particularly to such devices utilized in transferring motion between an actuating mechanism and an electrical switching apparatus.

In most large switching apparatuses motion is transferred from an actuating mechanism to a switching mechanism, such as in circuit breaker control mechanisms and similar electrical mechanisms, by motion transfer connecting devices, or pushrod assemblies. These devices transfer the motion between the mechanisms and typically have an insulating member such as a fiberglass tube with connecting hardware at each end and are subject to compressive and tensile stresses. Normally the tensile stress is a more significant problem than the compressive stress for making the connection between the tube and the hardware.

With this invention a motion transfer connecting device readily withstands tensile stressing and vibration during operation, and has any necessary or desirable insulation level. The device has an end structure connected to a hollow insulating rod, or tube. The end structure applies the tensile loading uniformly around the circumference at the end of the tube, thereby eliminating the need, as in most prior art devices, for pins or other mechanical devices that puncture the tube near its end section and thereby weaken it.

Other advantages and objects of this invention will be apparent from the following detailed description.

Figure 1:
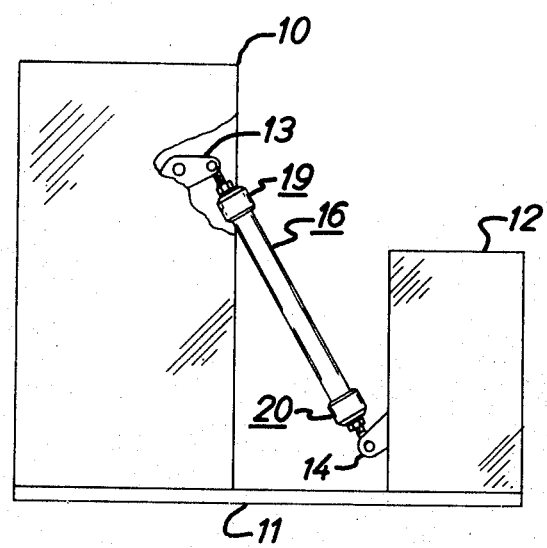
FIG. 1 is a simplified schematic of a switch actuating mechanism and a switch connected by a motion transfer connecting device according to this invention.

Referring to FIG. 1, an actuating mechanism or device, such as a switchgear control mechanism 12, is mounted on a platform 11 adjacent to a controlled switching mechanism or device 10 that would typically be an oil immersed switch or a vacuum switch. Motion from the switchgear mechanism is transferred from switchgear mechanism 12 through a toggle linkage 13 of any type known in the art by a motion transfer connecting device, or pushrod assembly, 16 to switching mechanism 10 through a switching arm 14 in any manner known in the art.

Figure 2:
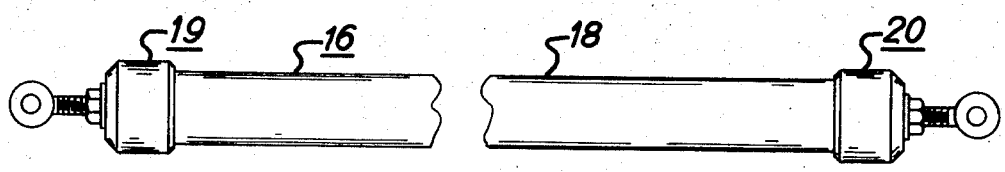
FIG. 2 is a detailed drawing of the motion transfer connecting device shown in FIG. 1.

Referring to FIG. 2, motion transfer device 16 comprises a hollow insulating rod or tube 18 made of any suitable material, such as glass fiber and epoxy, having the desired electrical insulating characteristics and the thickness and diameter needed to operate effectively under the encountered load conditions. The motion transfer device also comprises an end fastening assembly 19 and an end fastening assembly 20 which are identical in construction. Assemblies 19 and 20 are each connected to an end of tube 18 with end fastening assembly 19 connected to toggle linkage 13 and end fastening assembly 20 connected to switching arm 14.

Figure 3:
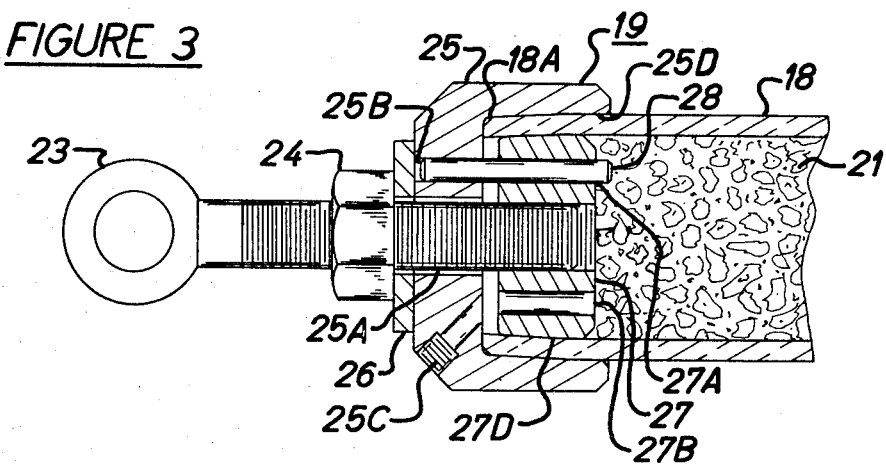
FIG. 3 is a detailed partial cross-sectional view of a part of the device shown in FIG. 2.

Referring to FIG. 3, end fastening assembly 19, which is identical to end fastening assembly 20, is connected to tube 18. Tube 18 is filled with a suitable insulating and track resistant foam material 21, such as polyurethane. End fastening assembly 19 comprises a connecting member such as an eyebolt 23, a set nut 24 screwed onto eyebolt 23, an end cap or socket 25 that fits over the outer diameter of tube 18, a washer 26 between set nut 24 and end socket 25, an inner tapered plug or wedge such as a conical nut 27, and a retaining pin 28. End socket 25 has a hole 25A through its center for receiving eyebolt 23, a hole 25B through its base to receive retaining pin 28, and a screw tapped hole 25C for permitting the insertion of foam 21 into the inside of tube 18. The tapped thread of hole 25C enables a screw to be put into the hole to seal the tubing and thereby prevent contamination of the interior of tube 18, particularly if a foam material is not used. Inner diameter 25D of socket 25 is bevelled or has a truncated conical shape at least over a portion of its length so that its diameter is smaller near its base with the smaller diameter section slightly smaller than the outer diameter of tube 18.

Conical plug nut 27 has a hole 27A positioned to receive retaining pin 28 when retaining pin is inserted through hole 25B of socket 25 and a hole 27B that permits foam to easily move from hole 25C to the inside of tube 18. Conical nut 27 has an outer diameter 27D that is bevelled or has a truncated conical shape at least over a portion of its length with the smaller diameter section adjacent the base of socket 25. The conical angle of nut 27 may be the same or slightly different than the angle of the conical surface of inner diameter 25D of socket 25 depending on the size and material of tube 18, and has a larger diameter section about the same size as or slightly smaller than the inner diameter of tube 18.

The effectiveness of end fastening assembly 19 is created because the spacing between outer diameter 27D of conical nut 27 and inner diameter 25D of socket 25 is selected to squeeze the end of tube 18 slightly inwardly and compress the end portions of tube 18 with end socket 25 over the end of the tube as conical nut 27 is forced towards the base of socket 25. A bevel 18A is cut on the outer diameter of tube 18 to make it easier to start the movement of the tube into socket 25.

In assembling, conical nut 27, set nut 24 and washer 26 are placed on eyebolt 23, and conical nut 27 is inserted into the hollow rod a distance greater than the depth of socket 25. Socket 25 and tube 18 are forced together to pass the outer diameter of socket 25 over tube 18 until tube 18 is against the base of socket 25. Eyebolt 23 is screwed into conical nut 27 and conical nut is forced toward socket 25 by either screwing eyebolt 23 into conical nut 27 against set nut 24 and washer 26 to draw conical nut 27 towards the base of socket 25, or conical nut 27 is pulled in by another force applied between socket 25 and eyebolt 23 to pull plug or nut 27 towards the base of socket 25.

When socket 25 is forced over the end of tube 18, the tube is pushed inwardly by the decreasing inner diameter of socket 25 and, upon pulling nut 27 towards socket 25, the end of the tube is compressed between the conical surfaces of socket 25 and nut 27. The ends of tube 18 get slightly thicker adjacent the base of socket 25 as the end portions of the tubes are compressed. This creates an actual physical barrier holding tube 18, and it becomes almost impossible to pull the fastening assembly off tube 18 because the entire tube circumference of the end portion acts as a barrier to retain the end fastening assembly on the tube.

Retaining pin 28 insures that conical nut 27 will not turn with eyebolt 23 in the event that nut 27 is brought up by tightening set nut 24 against socket 25. Once conical nut 27 and socket 25 are tightened in position, eyebolt 23 may be turned out or in as desired and tightened against socket 25 by the tightening of set nut 24 and washer 26 to adjust the overall length of the motion transfer device.

The end fastening assemblies provide a means for attaching to a hollow connecting rod that provides maximum possible mechanical connection between the tube and the end assembly. No holes are drilled and no chemical adhesives are applied to weaken the structure of the tube. Since the rod is typically made up of fiberglass or some other filament reinforced resin, these considerations become important and also enable a freer selection of material based upon its insulating characteristics. In addition, the compression of the rod at its ends by the end fastening assembly essentially preloads the connection between the tube ends and the assembly, and this eliminates any stress reversals at the places of connection of the materials and eliminates any movement between the assembly and the tube ends, thereby eliminating failure because of the effect of dynamic and changing loading cycles or vibration.

While this motion transfer device has many advantages in electrical motion transfer systems, the invention has application in other areas where similar connection and structural problems are encountered.

I claim:

1. A motion transfer connecting device comprising:
   a hollow tube;
   an end socket having a base substantially against the end of the tube, and an inner diameter having a truncated conical inner shape at least over a portion of its length with its smaller inner diameter section adjacent said base and slightly smaller than the outer diameter of said tube; and
   an inner nut having an outer diameter portion having a truncated conical shape at least over a portion of its length with its larger diameter about the same as the inner diameter of the tube and with the smaller diameter section adjacent the base of the socket whereby the circumferential end of said tube is compressed between the inner diameter of said socket and the outer diameter of said nut.

2. A device according to claim 1 also comprising a first means for rigidly connecting the socket and the plug and a second means for connecting said device to an actuating mechanism.

3. A device according to claim 2 wherein said inner nut is a conical nut.

4. A motion transfer device according to claim 3 wherein said socket has a hole for passing a bolt and wherein first and second means comprise an eyebolt passing through said hole in said socket and screwed into the inner nut and a nut screwed on the eyebolt for tightening against the socket.

5. A pushrod assembly having a hollow rod and end fastening assemblies attached to each end of the hollow rod, each of said end assemblies comprising:
   an end socket having a base and a truncated conical inner diameter with its smaller inner diameter section next to said base;
   an inner plug having an outer truncated conical diameter with its smaller diameter section adjacent the base of the socket; and
   said end socket positioned with its base against the end of the rod and said plug positioned adjacent the base of the end socket to circumferentially compress said rod between said socket and said nut.

6. An assembly according to claim 5 wherein said rod has an inner and an outer diameter and said smaller diameter section of the end socket is slightly smaller than the outer diameter of the rod and the larger diameter section of the inner plug is approximately the same as or slightly smaller than the inner diameter of the rod.

7. An assembly according to claim 6 wherein said inner plug is a nut.

8. An assembly according to claim 7 wherein said end socket has an opening through the center of its base, and also comprising a bolt passing through said opening and screwed into the inner nut and a nut screwed on the bolt adjacent the socket.

9. An assembly according to claim 5 wherein said hollow rod is constructed of electrical insulating material.

10. An assembly according to claim 9 wherein said hollow rod is filled with an electrically track resistant foam.

11. An end fastening assembly for connecting to the end of a tube comprising:
    an end socket having a base, and a truncated conical inner diameter with its smaller diameter section adjacent the base; and
    an inner nut having a truncated outer diameter smaller than the inner diameter of the socket by approximately the thickness of the tube.

12. An end fastening assembly according to claim 11 also comprising a means for rigidly connecting the socket to the nut and a means for connecting said assembly to a mechanism.

13. An end fastening assembly according to claim 11 also comprising a means for rigidly connecting the socket to the nut.

14. An end fastening assembly according to claim 11 wherein said base and said nut have openings therethrough for permitting the passage of foam.

15. An end fastening assembly according to claim 11 wherein said end socket has a central opening through the center of the base; and also comprising a bolt passing through said opening and screwed into the inner nut, and a nut screwed on the bolt adjacent said socket.

16. An end fastening assembly according to claim 15 wherein said socket has a pin receiving opening in its base and said nut has a corresponding pin receiving opening adjacent said base pin opening, and also comprising a retaining pin through said pin receiving openings.

* * * * *